(12) United States Patent
Redding et al.

(10) Patent No.: US 9,987,684 B1
(45) Date of Patent: Jun. 5, 2018

(54) ADDITIVE MANUFACTURING USING A SELECTIVE RECOATER

(71) Applicant: GENERAL ELECTRIC COMPANY, Schenectady, NY (US)

(72) Inventors: MacKenzie Ryan Redding, Cincinnati, OH (US); Zachary David Fieldman, Hamilton, OH (US); Justin Mamrak, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/406,461

(22) Filed: Jan. 13, 2017

(51) Int. Cl.
  *B22F 3/10* (2006.01)
  *B22F 3/105* (2006.01)
  (Continued)

(52) U.S. Cl.
  CPC .......... *B22F 3/1055* (2013.01); *B23K 15/002* (2013.01); *B23K 15/0086* (2013.01);
  (Continued)

(58) Field of Classification Search
  CPC ............ B29C 67/0077; B29C 67/0085; B29C 64/214; B29C 64/255; B29C 64/307;
  (Continued)

(56) References Cited

U.S. PATENT DOCUMENTS 3,567,120 A    3/1971   Suda et al.
4,307,822 A *  12/1981  Hardesty ................ A01C 15/16
                                                    222/330
(Continued)

FOREIGN PATENT DOCUMENTS

DE      19649865 C1    2/1998
EP       2191922 A1    6/2010
(Continued)

OTHER PUBLICATIONS

GE Related Case Form.
(Continued)

*Primary Examiner* — Alison L Hindenlang
*Assistant Examiner* — Emmanuel S Luk
(74) *Attorney, Agent, or Firm* — General Electric Company; Brian P. Overbeck

(57) ABSTRACT

The present disclosure generally relates to additive manufacturing systems and methods on a large-scale format. One aspect involves a build unit that can be moved around in three dimensions by a positioning system, building separate portions of a large object. The build unit has an energy directing device that directs, e.g., laser or e-beam irradiation onto a powder layer. In the case of laser irradiation, the build volume may have a gasflow device that provides laminar gas flow to a laminar flow zone above the layer of powder. This allows for efficient removal of the smoke, condensates, and other impurities produced by irradiating the powder (the "gas plume") without excessively disturbing the powder layer. The build unit may also have a recoater that allows it to selectively deposit particular quantities of powder in specific locations over a work surface to build large, high quality, high precision objects.

10 Claims, 17 Drawing Sheets

(51) Int. Cl.
*B33Y 10/00* (2015.01)
*B33Y 30/00* (2015.01)
*B33Y 50/02* (2015.01)
*B33Y 40/00* (2015.01)
*B23K 15/00* (2006.01)
*B23K 26/342* (2014.01)
*B23K 26/14* (2014.01)
*B23K 26/08* (2014.01)
*B23K 37/02* (2006.01)

(52) U.S. Cl.
CPC ...... *B23K 26/0876* (2013.01); *B23K 26/1437* (2015.10); *B23K 26/342* (2015.10); *B23K 37/0235* (2013.01); *B33Y 10/00* (2014.12); *B33Y 30/00* (2014.12); *B33Y 40/00* (2014.12); *B33Y 50/02* (2014.12); *B22F 2003/1056* (2013.01)

(58) Field of Classification Search
CPC ................ B29C 64/343; B22F 3/1055; B22F 2003/1056; B22F 2998/10
USPC ...................................................... 425/174.4
See application file for complete search history.

(56) References Cited

U.S. PATENT DOCUMENTS

| | | | |
|---|---|---|---|
| 4,863,538 A | 9/1989 | Deckard | |
| 5,279,352 A * | 1/1994 | Graham | B22D 11/0668 164/432 |
| 5,460,758 A | 10/1995 | Langer et al. | |
| 5,997,795 A | 12/1999 | Danforth et al. | |
| 6,103,176 A * | 8/2000 | Nguyen | B29C 41/12 264/308 |
| 6,215,093 B1 | 4/2001 | Meiners et al. | |
| 6,949,216 B2 * | 9/2005 | Brice | B22F 3/008 252/502 |
| 7,713,454 B2 | 5/2010 | Larsson | |
| 7,836,572 B2 * | 11/2010 | Mons | B22F 3/1055 29/458 |
| 8,523,554 B2 * | 9/2013 | Tung | B33Y 30/00 222/233 |
| 9,144,940 B2 | 9/2015 | Martin | |
| 9,242,413 B2 * | 1/2016 | Hartmann | B22F 3/1055 |
| 9,475,233 B2 | 10/2016 | Schmehl | |
| 9,604,410 B2 * | 3/2017 | Okazaki | B29C 64/153 |
| 9,649,812 B2 * | 5/2017 | Hartmann | B22F 3/1055 |
| 9,650,537 B2 * | 5/2017 | Kunc | B29C 67/0055 |
| 2002/0195746 A1 * | 12/2002 | Hull | B29C 67/0062 264/401 |
| 2003/0006530 A1 * | 1/2003 | Gundlapalli | B29C 70/72 264/278 |
| 2004/0094728 A1 | 5/2004 | Herzog et al. | |
| 2005/0280185 A1 * | 12/2005 | Russell | B28B 1/001 264/308 |
| 2007/0026099 A1 * | 2/2007 | Hagiwara | B29C 67/0077 425/174.4 |
| 2009/0206522 A1 * | 8/2009 | Hein | B22F 3/1055 264/497 |
| 2010/0031882 A1 * | 2/2010 | Abe | B05C 19/04 118/620 |
| 2010/0090374 A1 * | 4/2010 | Dietrich | B22F 3/1055 264/497 |
| 2011/0223349 A1 | 9/2011 | Scott | |
| 2011/0278773 A1 | 11/2011 | Bokodi et al. | |
| 2013/0101746 A1 | 4/2013 | Keremes et al. | |
| 2013/0218241 A1 * | 8/2013 | Savoy | A61F 7/007 607/98 |
| 2013/0241095 A1 * | 9/2013 | Korten | A61C 13/0018 264/16 |
| 2014/0077422 A1 | 3/2014 | Minick | |
| 2014/0175708 A1 * | 6/2014 | Echigo | B29C 67/0077 264/460 |
| 2014/0265034 A1 * | 9/2014 | Dudley | B29C 67/0085 264/401 |
| 2014/0265049 A1 * | 9/2014 | Burris | B23K 26/034 264/497 |
| 2014/0302187 A1 * | 10/2014 | Pawlikowski | B29C 67/0085 425/174.4 |
| 2014/0348969 A1 | 11/2014 | Scott | |
| 2015/0050463 A1 * | 2/2015 | Nakano | B33Y 50/02 428/192 |
| 2015/0110910 A1 | 4/2015 | Hartmann et al. | |
| 2015/0266238 A1 * | 9/2015 | Ederer | B29C 67/0081 264/460 |
| 2015/0314373 A1 * | 11/2015 | Mironets | B22F 3/1055 419/30 |
| 2015/0343533 A1 * | 12/2015 | Park | B28B 7/465 425/78 |
| 2015/0367415 A1 * | 12/2015 | Buller | B23K 26/346 419/53 |
| 2015/0375340 A1 | 12/2015 | Gui et al. | |
| 2015/0375418 A1 * | 12/2015 | Hartmann | B29C 67/0085 264/128 |
| 2016/0067740 A1 | 3/2016 | Voris et al. | |
| 2016/0067779 A1 * | 3/2016 | Dautova | B29C 67/0077 419/7 |
| 2016/0067820 A1 * | 3/2016 | Mironets | B23K 26/0648 419/7 |
| 2016/0084089 A1 * | 3/2016 | Blaney | B22F 5/04 415/115 |
| 2016/0101469 A1 * | 4/2016 | Kawada | B22F 3/1007 425/78 |
| 2016/0107232 A1 * | 4/2016 | Okazaki | B29C 67/0077 425/78 |
| 2016/0129502 A1 * | 5/2016 | Varetti | B29C 31/044 425/78 |
| 2016/0144429 A1 * | 5/2016 | Mizutani | B22F 3/1055 425/78 |
| 2016/0236277 A1 * | 8/2016 | Doherty | B22F 3/1055 |
| 2016/0288264 A1 | 10/2016 | Jones et al. | |
| 2016/0303805 A1 | 10/2016 | Chen et al. | |
| 2016/0325503 A1 * | 11/2016 | Mironets | B29C 67/0077 |
| 2016/0339518 A1 * | 11/2016 | Nardi | B29C 67/0077 |
| 2016/0339519 A1 * | 11/2016 | Sargent | B22F 3/1055 |
| 2016/0339646 A1 | 11/2016 | Baecker et al. | |
| 2016/0368224 A1 * | 12/2016 | Ooba | B22F 3/008 |
| 2017/0014904 A1 * | 1/2017 | Brown | B22F 3/1055 |
| 2017/0014905 A1 * | 1/2017 | Kawada | B22F 3/1055 |
| 2017/0057013 A1 * | 3/2017 | Gillespie | B23K 26/342 |
| 2017/0246678 A1 * | 8/2017 | Bunker | B22C 9/10 |

FOREIGN PATENT DOCUMENTS

| | | | |
|---|---|---|---|
| EP | 2202016 A1 | | 6/2010 |
| JP | 2010265530 | * | 11/2010 |
| JP | 2012246541 | * | 12/2012 |
| JP | 2014125643 | * | 7/2014 |
| WO | 2014199149 A1 | | 12/2014 |
| WO | WO 2014/199149 A1 | | 12/2014 |

OTHER PUBLICATIONS

Популяк A.E-Promac S.A, Fiber tiled laser melting machine with Powder Bed Technology(1)—Patented from Adira Portugal, Nov. 3, 2016, https://www.youtube.com/watch?v=5HAJxVVucnM.

Alec, Adira unveils world's first Tiled Laser Melting metal 3D printer with biggest ever build volume, www.3ders.org, Nov. 3, 2016.

Sam Davies, Adira combines both laser-based additive manufacturing technologies in conceptual machine, www.tctmagazine.com, Nov. 30, 2016.

* cited by examiner

US 9,987,684 B1

ADDITIVE MANUFACTURING USING A SELECTIVE RECOATER

The present disclosure generally relates to methods and systems adapted to perform additive manufacturing ("AM") processes, for example by direct melt laser manufacturing ("DMLM"), on a larger scale format.

CROSS REFERENCE TO RELATED APPLICATIONS

Reference is made to the following related applications filed concurrently, the entirety of which are incorporated herein by reference:

U.S. patent application Ser. No. 15/406,467, titled "Additive Manufacturing Using a Mobile Build Volume," and filed Jan. 13, 2017.

U.S. patent application Ser. No. 15/406,454, titled "Additive Manufacturing Using a Dynamically Grown Build Envelope," and filed Jan. 13, 2017.

U.S. patent application Ser. No. 15/406,454, titled "Additive Manufacturing Using a Dynamically Grown Wall," and filed Jan. 13, 2017.

U.S. patent application Ser. No. 15/406,471, titled "Large Scale Additive Machine," and filed Jan. 13, 2017.

BACKGROUND

A description of a typical laser powder bed fusion process is provided in German Patent No. DE 19649865, which is incorporated herein by reference in its entirety. AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. No. 4,863,538 and U.S. Pat. No. 5,460,758, which are incorporated herein by reference, describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering ("DMLS") or direct metal laser melting (DMLM). The apparatus 100 builds objects, for example, the part 122, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a galvo scanner 132. The galvo scanner 132 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 114 is lowered and another layer of powder is spread over the powder bed and object being built, followed by successive melting/sintering of the powder by the laser 120. The powder layer is typically, for example, 10 to 100 microns. The process is repeated until the part 122 is completely built up from the melted/sintered powder material.

The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

FIG. 2 shows a side view of an object 201 built in a conventional powder bed 202, which could be for example a powder bed as illustrated by element 112 of FIG. 1. Then as the build platform 114 is lowered and successive layers of powder are built up, the object 201 is formed in the bed 202. The walls 203 of the powder bed 202 define the amount of powder needed to make a part. The weight of the powder within the build environment is one limitation on the size of parts being built in this type of apparatus. The amount of powder needed to make a large part may exceed the limits of the build platform 114 or make it difficult to control the lowering of the build platform by precise steps which is needed to make highly uniform additive layers in the object being built.

In conventional powder bed systems, such as shown in FIG. 1, the energy beam 136 must scan a relatively large angle $\Theta_1$ when building a part large enough to occupy most of the powder bed 118. This is because the angle $\Theta_1$ must increase as the cross-sectional area of the object increases. In general, when making these larger parts, the angle $\Theta_1$ becomes large at the periphery of the part. The energy density at the point of contact between the laser and powder bed then varies over the part. These differences in energy density affect the melt pool at large angles relative to that obtained when the laser is normal to the powder bed. These melt pool differences may result in defects and loss of fidelity in these regions of the part being built. These defects may result in inferior surface finishes on the desired part.

Another problem that arises with prior art methods and systems involves cooling the layer of powdered material and removing smoke, condensates, and other impurities produced by irradiating the powder (sometimes called the "gas plume"), which can contaminate the object and obscure the line of sight of the energy beam. It is also important to cool and solidify the layer quickly to avoid formation of deformations or other defects. For large objects, i.e. objects with a largest dimension in the xy plane (for conventional powder bed systems, the plane of the powder bed) of 400 to 450 mm, it is very difficult to provide consistent laminar gas flow and efficient removal of unwanted gasses, particulates, condensates, and other undesirable impurities and contaminants.

Another problem that arises in the prior art systems and methods is the need to finely control the quantity and location of powder deposited to avoid wasting powder, while also avoiding contact of the powder with undesirable materials. Prior art methods and systems deposit powder using blowing, sliding, or auger mechanisms. These mechanisms utilize multiple moving parts that may malfunction, or may be made of materials that are not suited to contact with the powder due to concerns with contamination.

For example, EP 2191922 and EP 2202016 to Cersten et al. discuss a powder application apparatus that dispenses powder using rotating conveyor shafts with recesses for holding separate, discrete amounts of powder. Such an apparatus is more prone to failure, because the rotating conveyor shafts must be in motion as long as powder is being deposited.

Other attempts to overcome the limitations of conventional powder bed systems have failed to address the problems associated with scale-up of these machines. In some cases, attempts to provide large format systems have introduced additional problems and challenges in creating laser fused parts from powder. Prior systems failed to provide uniform layer-wise powder distribution, effective management of the gas plume, and good control of the laser energy density over the part being produced.

For example, the concept of moving a laser within a build area was explored in U.S. Application Publication No. 2004/0094728 to Herzog et al., the present inventors have noted this disclosure does not address how powder might be distributed onto the part being built. These techniques imply more traditional laser powder deposition where powder is injected into a laser beam and melted onto the object being built. Because there is no discussion of how to achieve uniform layers or powder over the part being built, the dimensional accuracy of such systems are very limited. Moreover, because the build environment is large, achieving a suitable gas environment near the laser melt pool would be difficult.

In another example, the concept of a large format system whereby powder is deposited using a hopper is explored in U.S. Patent Application Publication No. 2013/0101746 to Keremes et al. Material 30 is deposited onto a part 40 being built using a material applicator 28. Retaining walls 42 are utilized to allow material 30 to build up as the part 40 is made. The system utilizes a laser 18 placed in a stationary position near the top of the build chamber. As the part 40 grows in size, the angle of the laser beam 20 increases, particularly at the peripheral regions of the part. In addition, because material 30 is deposited onto the part 40, the thickness of the material 30 deposited onto the part 40 is difficult to control precisely.

International Application No. WO 2014/199149 titled "Additive Manufacturing Apparatus and Method" to McMurtry et al. ("McMurtry") discusses utilizing multiple polygonal mirrors with a localized gasflow device to build separate portions of an object in a single dimension, i.e. along a line, and lowering the build platform to provide another layer of powder. For large objects, it is difficult to build a platform that can both stably hold sufficient powder, and also be lowered by the precise layer thickness required.

There remains a need for a large format powder manufacturing system that overcomes the above-mentioned problems.

SUMMARY OF THE INVENTION

The present invention relates to an additive manufacturing apparatus. In an embodiment, the apparatus comprises a build unit with a powder dispenser and a recoater blade, an irradiation emission directing device, and a positioning system, the positioning system adapted to move the build unit in at least three dimensions which may be, for example, x, y, and z coordinates, during operation. The build unit may also be rotated in the x-y plane. Advantageously, according to an embodiment of the present invention the positioning system can move the build unit within a volume that is at least ten times larger than the cube of the width of the recoater blade. The build unit may also move the build unit around an xy area that is at least ten times larger than the square of the recoater blade width. The irradiation emission directing device may be adapted to direct laser irradiation or e-beam irradiation. For instance, the irradiation emission directing device could be an optical mirror or lens, or it could be an electromagnetic coil.

The build unit may further comprise a laminar gasflow zone within a gasflow device adapted to provide substantially laminar gas flow over a work surface. The gasflow device may also be adapted to provide a reduced oxygen environment over the work surface. During operation, if the gasflow device provides gas flow over the work surface, then the irradiation emission directing device is adapted to direct laser irradiation from a laser source. The laser source may be within the build unit or outside the build unit. If the laser source is within the build unit, for instance in the case that a fiber optic cable extends from the laser to the build unit, the fiber optic cable transports the laser irradiation from the laser to the irradiation emission directing device (which is within the build unit), then the build unit may further comprise a second positioning system attached to the laser source, the second positioning system adapted to move the laser source within the build unit, independent of the motion of the build unit.

The present invention also relates to a method for fabricating an object. In an embodiment, the method comprises (a) moving a build unit to deposit a first layer of powder over at least a first portion of a first build area, the build unit comprising a powder dispenser and a recoater blade, (b) irradiating at least part of the first layer of powder within the first build area to form a first fused layer, (c) moving the build unit upward in a direction substantially normal to the first layer of powder, then (d) repeating to form the object. After step (b), but before step (c), the method may further comprise at least the steps of (a') moving the build unit to deposit a second layer of powder, the second layer of powder abutting the first layer of powder; and (b') irradiating at least part of the second layer of powder to form a second fused layer. The irradiation may be laser irradiation or e-beam irradiation. When there is a gasflow device providing substantially laminar gas flow to a laminar gasflow zone over a work surface, then the irradiation is laser irradiation.

The present invention also relates to an additive manufacturing apparatus comprising a selective recoater. In an embodiment, the apparatus comprises a powder dispenser, e.g. a hopper, the powder dispenser comprising a powder storage area and at least a first and second gate, the first gate operable by a first actuator that allows opening and closing the first gate, the second gate operable by a second actuator that allows opening and closing the second gate, and each gate adapted to control the dispensation of powder from the powder storage area onto a work surface. The powder dispenser may have any number of powder gates, for instance at least ten powder gates, or more preferably at least twenty gates. Advantageously, the powder dispenser and each gate may be made of the same material, for instance cobalt-chrome, which may also be the material of the powder. Each actuator may be, for example, either an electric actuator or a pneumatic actuator. The selective recoater may be part of a build unit adapted to provide a layer of powder over the work surface. The build unit may further comprise an irradiation emission directing device, which may be adapted to direct a laser irradiation, or it may be adapted to direct e-beam irradiation. The build unit may further comprise a gasflow device adapted to provide substantially laminar gas flow over the layer of powder.

The present invention also relates to a method for fabricating an object using a selective recoater. In an embodiment, the method comprises (a) depositing powder onto a work surface from a powder dispenser, the powder dispenser comprising a powder storage area and at least a first and second gate, the first gate operable by a first actuator that allows opening and closing the first gate, the second gate operable by a second actuator that allows opening and closing the second gate, and each gate adapted to control the dispensation of powder from the powder storage area onto the work surface; (b) irradiating at least part of the first layer of powder to form a first fused layer; and (c) repeating at least steps (a) through (b) to form the object. Each gate may be attached to a spring mounted to the powder dispenser that opposes the force of the actuator. The powder used may be a material suitable for additive manufacturing, such as cobalt-chrome, and each surface of the powder dispenser and gates that comes into contact with the powder may be made from the same material. The method may further comprise a step of opening the first gate while leaving the second gate closed to selectively deposit powder onto the work surface. The method may also involve irradiating at least part of the first layer of powder to form a portion of a build envelope, and opening the first gate to deposit powder within the build envelope while closing the second gate to avoid depositing powder outside the build envelope.

The present invention also relates to an additive manufacturing apparatus comprising a mobile gasflow device. In an embodiment, the apparatus comprises a laser emission directing device, a build unit comprising a gasflow device adapted to provide substantially laminar gas flow to a laminar gasflow zone within two inches of, and substantially parallel to, a work surface, a positioning system adapted to provide independent movement of the build unit in at least two dimensions that are substantially parallel to the work surface, the laser emission directing device adapted to direct laser irradiation to a build area over the work surface during operation of the apparatus. The positioning system may be adapted to provide independent movement of the build unit in at least three dimensions. The positioning system may also be adapted to allow for rotation of the build unit in two dimensions substantially parallel to the work surface. The gasflow device may be adapted to maintain a laminar gasflow zone, to provide a low oxygen environment around the work surface in a region below the build unit. There may also be a reduced oxygen gas zone above the laminar gasflow zone. Both gas zones may be contained within a containment zone surrounding at least the build unit and positioning system. The laser emission directing device may be within the build unit, and the laser irradiation may be transported from a laser to the laser emission directing device via a fiber-optic cable. The build unit may further comprise a powder delivery unit and a recoater arm.

The present invention also relates to a method for fabricating an object using a gasflow device with a laminar flow zone. In an embodiment, the method comprises (a) moving a build unit over a build area of a work surface, the build unit comprising a gasflow device around a laminar flow zone over the build area, the gasflow device providing substantially laminar gas flow within two inches of, and substantially parallel to, the work surface, (b) irradiating at least a portion of the build area of the work surface with a laser that passes through the laminar flow zone to form a first fused layer; and (c) repeating at least steps (a) through (b) to form the object. The method may further comprise a step (d) of moving the build unit vertically away from the work surface. Steps (a) and (b) may be repeated after step (d). The build unit may be rotated 90° and moved in a direction perpendicular to the direction of movement in step (a).

The present invention also relates to an apparatus for making an object from powder using a mobile scan area. In an embodiment, the apparatus comprises a build unit with a powder delivery unit, a recoater arm, a laser emission directing device, and a gasflow device around a laminar flow zone, the gasflow device adapted to provide substantially laminar gas flow within two inches of, and substantially parallel to, a work surface, and a positioning system adapted to provide independent movement of the build unit in at least three dimensions. The apparatus may further comprise a containment zone enclosing the build unit and positioning system. The build unit may be at least partially enclosed to form a low oxygen environment above the build area of the work surface, i.e. around the path of the beam. The laser emission directing device may be positioned within the build unit at a height such that, when the apparatus is in operation, the maximum angle of the laser beam relative to normal within the build area is less than about 15°. A fiber-optic cable may extend from the laser to the build unit, and thus transport laser irradiation from the laser to the laser emission directing device. The laser emission directing device may have a laser positioning unit that allows movement of the laser emission directing device within the build unit, independent of the motion of the build unit. The build unit may further comprise an x-y axis galvo adapted to control the laser beam in x-y, and the laser positioning system may be adapted to move the laser emission directing device in x, y, and/or z. The positioning system may be adapted to allow rotation of the build unit in the two dimensions that are substantially parallel to the work surface.

The present invention also relates to a method for fabricating an object using a mobile scan area. In an embodiment, the method comprises (a) moving a build unit to deposit a first layer of powder over at least a first portion of a first build area, the build unit comprising a powder delivery unit, a recoater arm, a laser emission directing device, and a gasflow device around a laminar flow zone over a build area of a work surface, the gasflow device providing substantially laminar gas flow within two inches of, and substantially parallel to, the work surface; (b) irradiating at least part of the first layer of powder within the first build area to form a first fused layer; (c) moving the build unit upward in a direction substantially normal to the first layer of powder; and (d) repeating at least steps (a) through (c) to form the object. Steps (a) and (b) may be repeated after step (d). The laser emission directing device may be positioned within the build unit at a height above the build area to provide a maximum angle relative to normal within the build area of less than 15°.

The present invention also relates to a method for fabricating an object using a recoater blade and a dynamically grown build envelope. In an embodiment, the method comprises (a) moving a recoater blade to form a first layer of powder over at least a portion of a first build area, (b) irradiating at least part of the first layer of powder within the first build area to form a first fused layer, and (c) repeating steps (a) and (b) to form the object, wherein a build envelope retains unfused powder about the object and has a volume that is larger than the cube of the recoater blade width. For instance, it may be ten times larger than the cube of the recoater blade width. The method may further comprise the steps (a') moving the recoater to form a second layer of powder over at least a portion of a second build area and adjacent the first layer of powder; and (b') irradiating at least part of the second layer of powder within the second build area to form a second fused layer. Steps (a') and (b') may be performed after step (b) but before step (c). The method may further comprise a step (d) of removing the build envelope and unfused powder within an envelope area to reveal the object. The powder material may be cobalt-chrome. The build envelope may be formed from powder fused by irradiation. For example, the build envelope may be formed by laser powder deposition. The second layer of powder may be substantially even with the first layer of powder. The irradiation may be conducted in a reduced oxygen environment, and may be laser irradiation. The irradiation may also be e-beam irradiation. The method may further comprise using a second build unit to build at least a portion of a second object. The method may also comprise using a second build unit to build at least a portion of the build envelope.

The present invention also relates to a method for fabricating an object using a build unit and a dynamically grown build envelope. In an embodiment, the method comprises (a) moving a build unit to deposit a first layer of powder over at least a first portion of a first build area, the build unit comprising a powder dispenser, a recoater blade, and a directed energy emission directing device; (b) irradiating at least part of the first layer of powder within the first build area to form a first fused layer of the object; and (c) repeating steps (a) and (b) to form the object, wherein a build envelope retains unfused powder. The method may further comprise (a') moving the recoater to form a second layer of powder over at least a portion of a second build area and abutting the first layer of powder; and (b') irradiating at least part of the second layer of powder within the second build area to form a second fused layer. Steps (a') and (b') may be performed after step (b) but before step (c). The method may further comprise step (d) of removing the build envelope and unfused powder within the envelope area to reveal the object. The powder material may be cobalt-chrome. The build envelope may be formed from powder fused by irradiation. For example, the build envelope may be formed by laser powder deposition. The second layer of powder may be substantially even with the first layer of powder. The irradiation may be conducted in a reduced oxygen environment, and may be laser irradiation. The irradiation may also be from an electron beam.

In general, any number of build units may be used in parallel, i.e. substantially simultaneously, to build one or more object(s) and/or build envelope(s), all on the same work surface.

DETAILED DESCRIPTION

This detailed description and accompanying figures demonstrate some illustrative embodiments of the invention to aid in understanding. The invention is not limited to the embodiments illustrated in the figures, nor is it limited to the particular embodiments described herein.

The present invention relates to an apparatus that can be used to perform additive manufacturing, as well as methods for utilizing the apparatus to additively manufacture objects. The apparatus includes components that make it particularly useful for making large additively manufactured objects. One aspect of the present invention is a build unit. The build unit may be configured to include several components necessary for making high precision, large scale additively manufactured objects. These components may include, for example, a recoater, a gasflow device with a gasflow zone, and an irradiation emission directing device. An irradiation emission directing device used in an embodiment of the present invention may be, for example, an optical control unit for directing a laser beam. An optical control unit may comprise, for example, optical lenses, deflectors, mirrors, and/or beam splitters. Advantageously, a telecentric lens may be used. Alternatively, the irradiation emission directing device may be an electronic control unit for directing an e-beam. The electronic control unit may comprise, for example, deflector coils, focusing coils, or similar elements. The build unit may be attached to a positioning system (e.g. a gantry, delta robot, cable robot, robot arm, belt drive, etc.) that allows three dimensional movement throughout a build environment, as well as rotation of the build unit in a way that allows coating of a thin powder layer in any direction desired.

Figure 1:
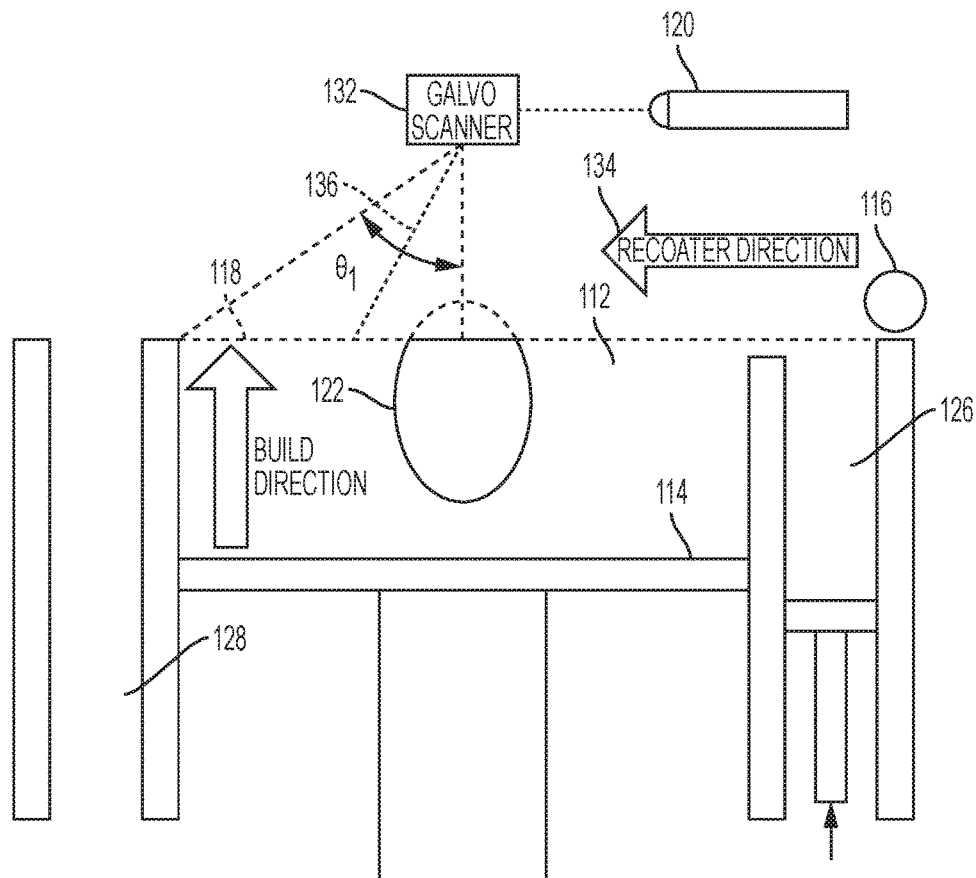
FIG. 1 shows an exemplary prior art system for DMLM using a powder bed.
Figure 2:
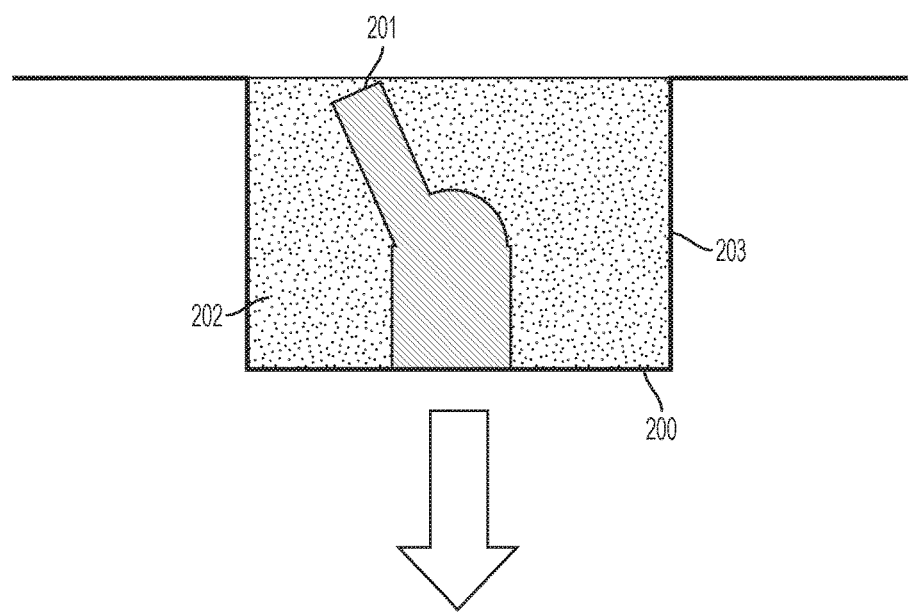
FIG. 2 shows a conventional powder bed that is moved down as the object is formed.
Figure 3:
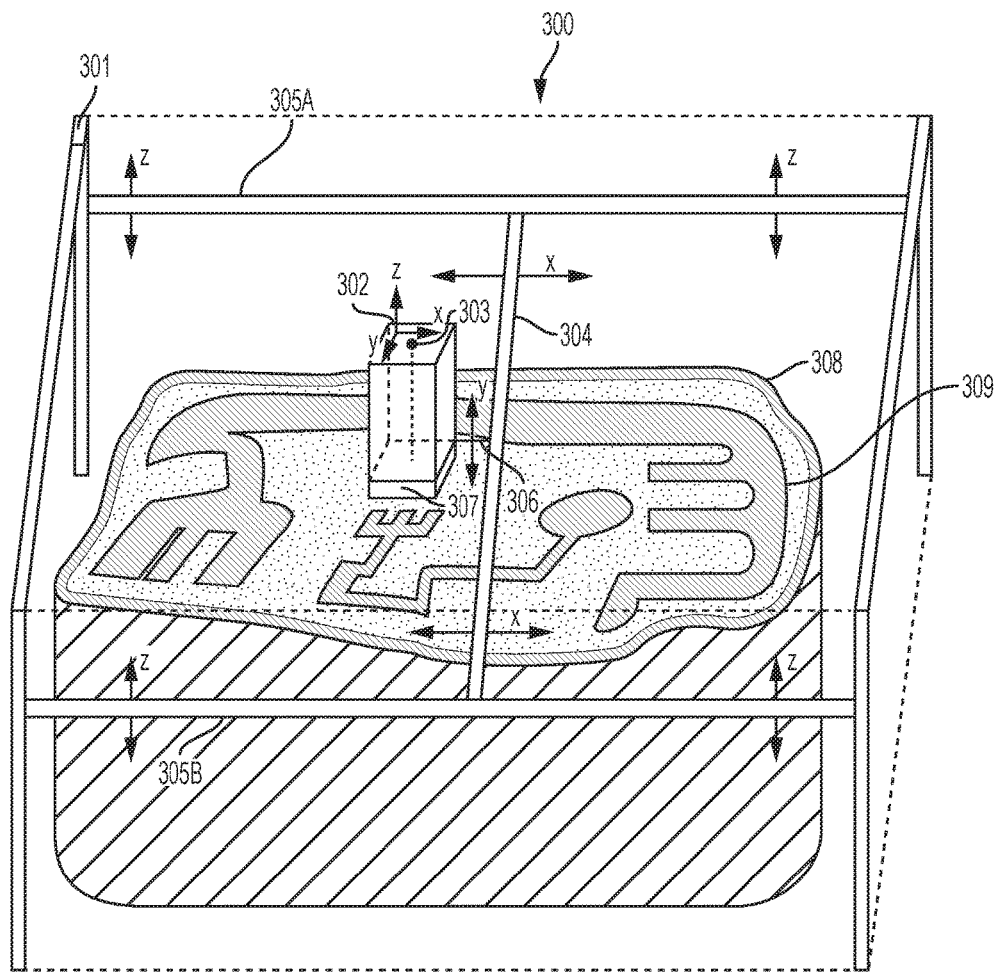
FIG. 3 shows a large scale additive manufacturing apparatus according to an embodiment of the invention.

FIG. 3 shows an example of one embodiment of a large-scale additive manufacturing apparatus 300 according to the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser irradiation that is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. When the irradiation source is an electron source, then the electron source originates the electrons that comprise the e-beam that is directed by the irradiation emission directing device. When the irradiation source is an electron source, then the irradiation emission directing device may be, for example, a deflecting coil. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone as illustrated in FIG. 3, 307 and FIG. 4, 404. If an e-beam is desired, then no gasflow is provided. An e-beam is a well-known source of irradiation. For example, U.S. Pat. No. 7,713,454 to Larsson titled "Arrangement and Method for Producing a Three-Dimensional Product" ("Larsson") discusses e-beam systems, and that patent is incorporated herein by reference. When the source is an electron source, then it is important to maintain sufficient vacuum in the space through which the e-beam passes. Therefore, for an e-beam, there is no gas flow across the gasflow zone (shown, for example at FIG. 3, 307).

Another advantage of the present invention is that the maximum angle of the beam may be a relatively small angle $\Theta_2$ to build a large part, because (as illustrated in FIG. 3) the build unit 302 can be moved to a new location to build a new part of the object being formed 309. When the build unit is stationary, the point on the powder that the energy beam touches when $\Theta_2$ is 0 defines the center of a circle in the xy plane (the direction of the beam when $\Theta_2$ is approximately 0 defines the z direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

In some embodiments, the recoater used is a selective recoater. One embodiment is illustrated in FIGS. 4 through 7.

Figure 4:
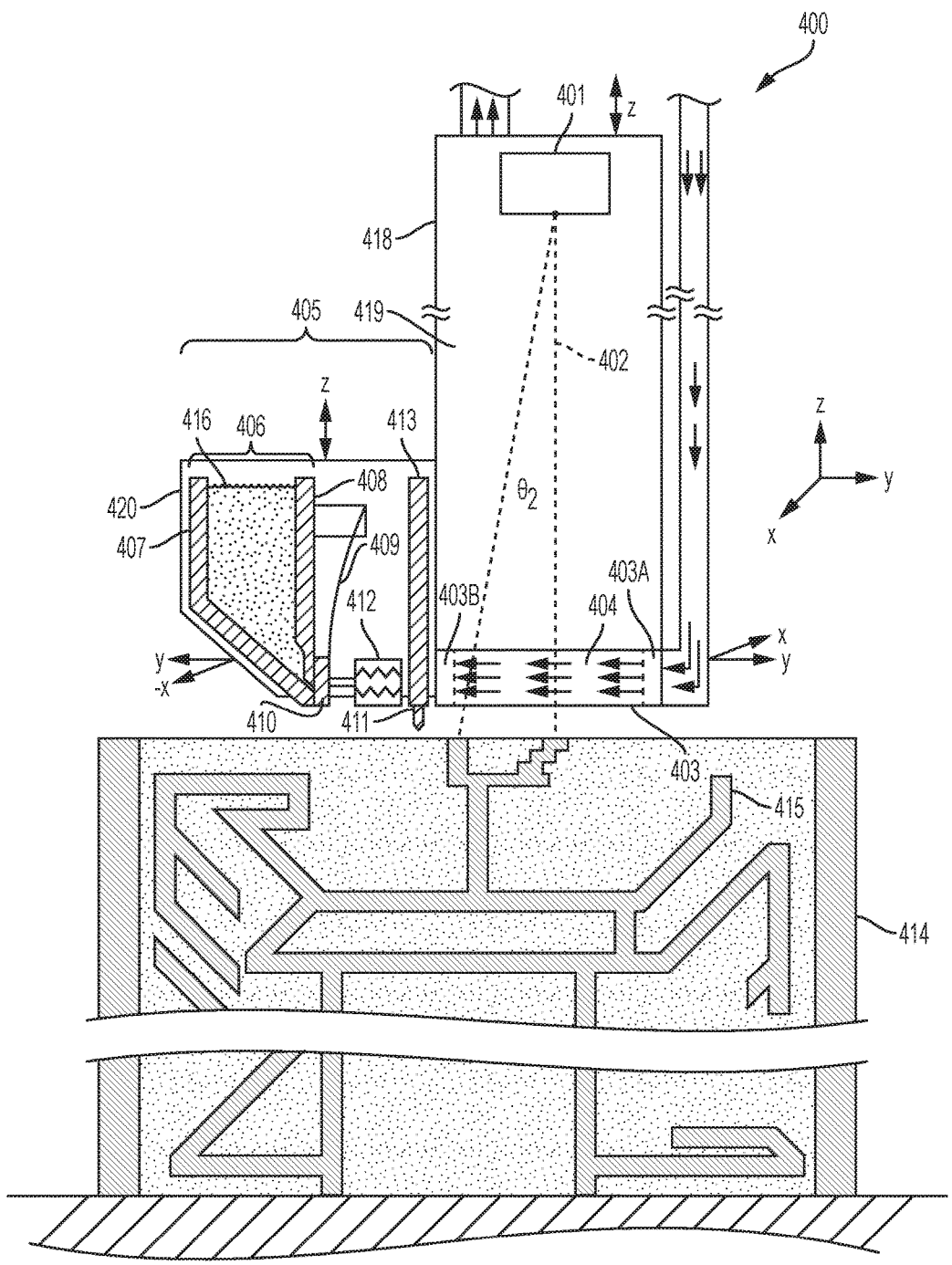
FIG. 4 shows a side view of a build unit according to an embodiment of the invention.

FIG. 4 shows a build unit 400 comprising an irradiation emission directing device 401, a gasflow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 4 also shows a build envelope 414 that may be built by, for example, additive manufacturing or Mig/Tig welding, an object being formed 415, and powder 416 contained in the hopper 405 used to form the object 415. In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular illustration of one embodiment of the present invention, the gas flow in the gasflow zone 404 flows in the y direction, but it does not have to. The recoater blade 411 has a width in the x direction. The direction of the irradiation emission beam when $\Theta_2$ is approximately 0 defines the z direction in this view. The gas flow in the gasflow zone 404 may be substantially laminar. The irradiation emission directing device 401 may be independently movable by a second positioning system (not shown). This illustration shows the gate plate 410 in the closed position.

Figure 5:
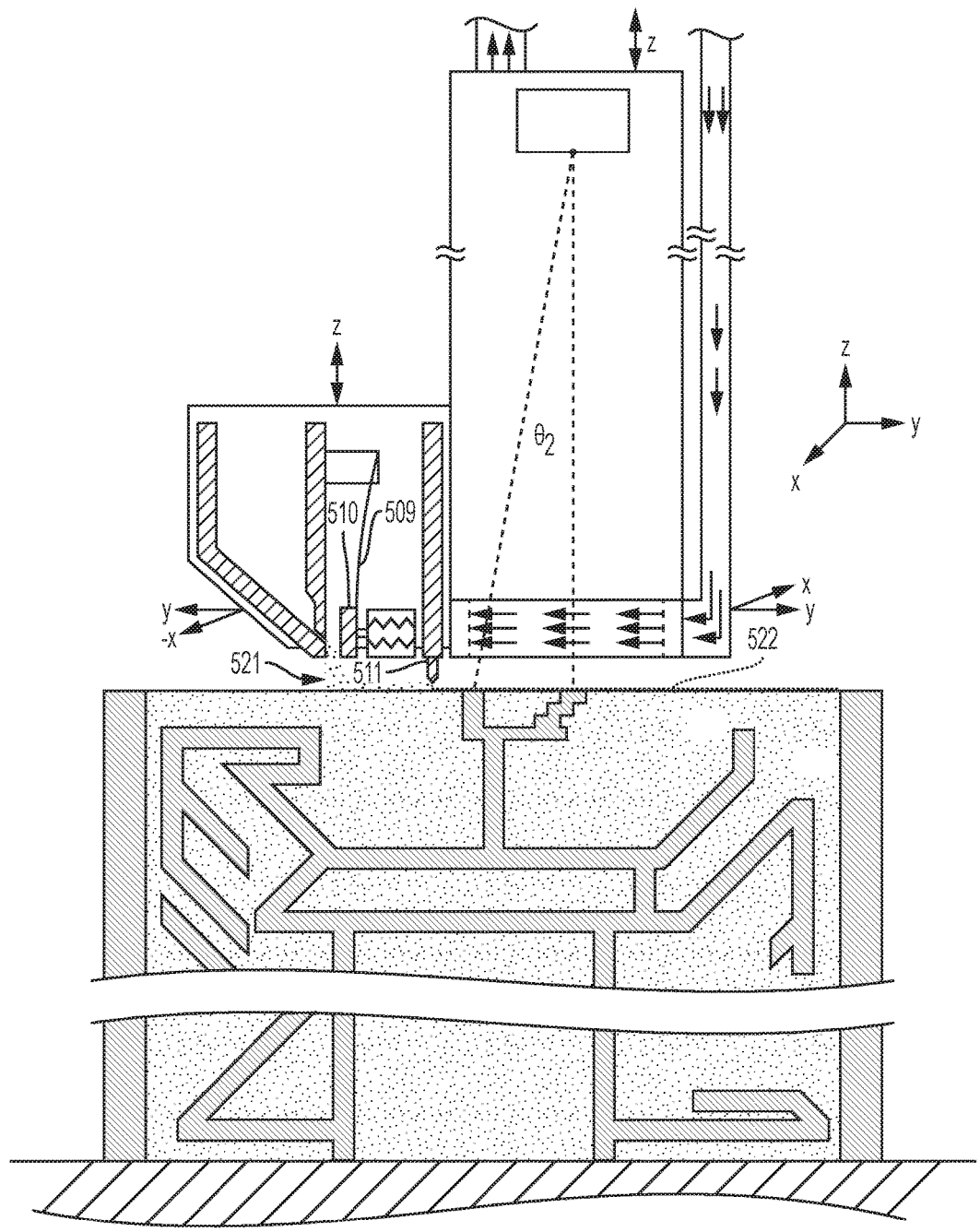
FIG. 5 shows a side view of a build unit dispensing powder according to an embodiment of the invention.

FIG. 5 shows the build unit of FIG. 4, with the gate plate 410 in the open position (as shown by element 510) and actuating element 509. Powder in the hopper is deposited to make fresh powder layer 521, which is smoothed over by the recoater blade 511 to make a substantially even powder layer 522. In some embodiments of the present invention, the substantially even powder layer may be irradiated at the same time that the build unit is moving, which would allow for continuous operation of the build unit and thus faster production of the object.

Figure 6:
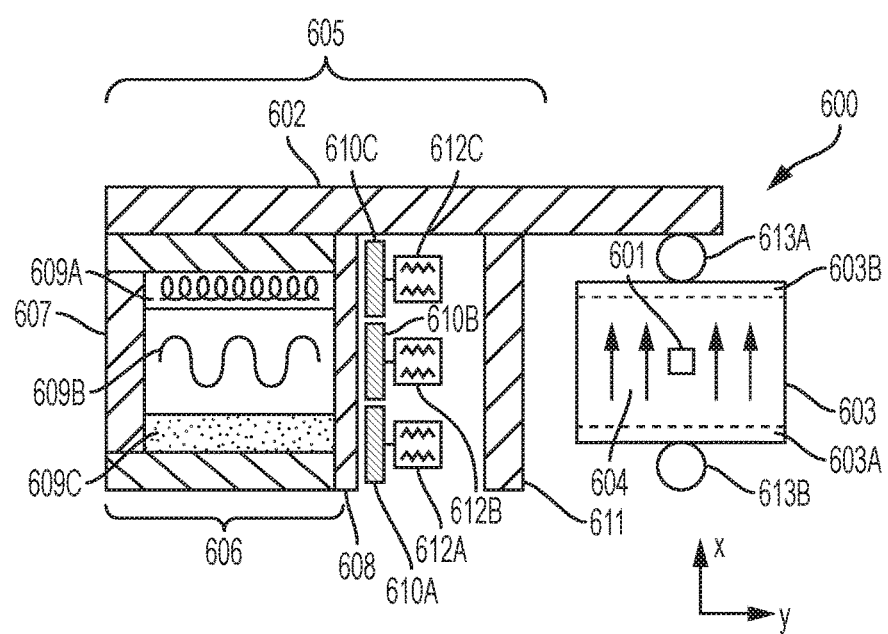
FIG. 6 shows a top view of a build unit according to an embodiment of the invention.

FIG. 6 shows a top down view of the build unit of FIG. 4. For simplicity, the object and the walls are not shown here. The build unit 600 has an irradiation emission directing device 601, an attachment plate 602 attached to the gasflow device 603, hopper 606, and recoater arm 611. The gasflow device has a gas outlet portion 603A and a gas inlet portion 603B. Within the gasflow device 603 there is a gasflow zone 604. The gasflow device 603 provides laminar gas flow within the gasflow zone 604. There is also a recoater 605 with a recoater arm 611, actuating elements 612A, 612B, and 612C, and gate plates 610A, 610B, and 610C. The recoater 605 also has a hopper 606 with a back plate 607 and front plate 608. In this particular illustration of one embodiment of the present invention, the hopper is divided into three separate compartments containing three different materials 609A, 609B, and 609C. There are also gas pipes 613A and 613B that feed gas out of and into the gasflow device 603.

Figure 7:
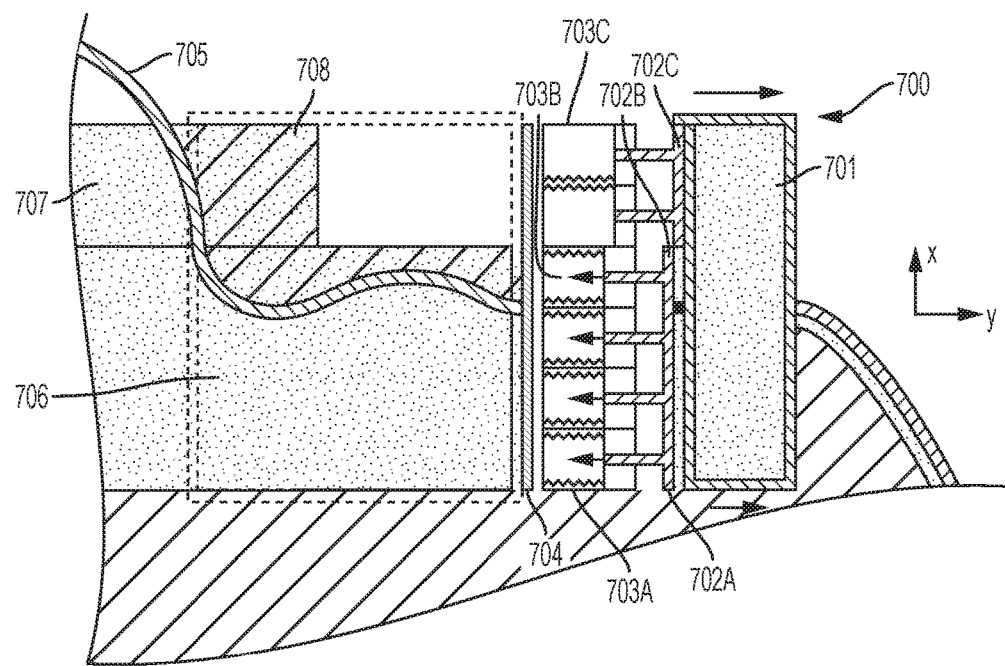
FIG. 7 shows a top view of a recoater according to an embodiment of the present invention.

FIG. 7 shows a top down view of a recoater according to an embodiment of the invention. In this particular illustration the recoater has a hopper 700 with only a single compartment containing a powder material 701. There are three gate plates 702A, 702B, and 702C that are controlled by three actuating elements 703A, 703B, and 703C. There is also a recoater arm 704 and a wall 705. When the recoater passes over a region that is within the wall, such as indicated by 707, the corresponding gate plate 702C may be held open to deposit powder in that region 707. When the recoater passes over a region that is outside of the wall, such as the region indicated as 708, the corresponding gate plate 702C is closed by its corresponding actuating element 703C, to avoid depositing powder outside the wall, which could potentially waste the powder. Within the wall 705, the recoater is able to deposit discrete lines of powder, such as indicated by 706. The recoater blade (not shown in this view) smoothes out the powder deposited.

Advantageously, a selective recoater according to an embodiment of the present invention allows precise control of powder deposition using powder deposition device (e.g. a hopper) with independently controllable powder gates as illustrated, for example, in FIG. 6, 606, 610A, 610B, and 610C and FIG. 7, 702A, 702B, and 702C. The powder gates are controlled by at least one actuating element which may be, for instance, a bidirectional valve or a spring (as illustrated, for example, in FIG. 4, 409. Each powder gate can be opened and closed for particular periods of time, in particular patterns, to finely control the location and quantity of powder deposition (see, for example, FIG. 6). The hopper may contain dividing walls so that it comprises multiple chambers, each chamber corresponding to a powder gate, and each chamber containing a particular powder material (see, for example, FIG. 6, and 609A, 609B, and 609C). The powder materials in the separate chambers may be the same, or they may be different. Advantageously, each powder gate can be made relatively small so that control over the powder deposition is as fine as possible. Each powder gate has a width that may be, for example, no greater than about 2 inches, or more preferably no greater than about ¼ inch. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to an embodiment of the present invention is simpler and thus less prone to malfunctioning. It also advantageously permits the powder to come into contact with fewer parts, which reduces the possibility of contamination. Advantageously, a recoater according to an embodiment of the present invention can be used to build a much larger object. For example, the largest xy cross sectional area of the recoater may be smaller than the smallest cross sectional area of the object, and there is no particular upper limit on the size of the object relative to the recoater. Likewise, the width of the recoater blade may smaller than the smallest width of the object, and there is no particular upper limit on the width of the object relative to the recoater blade. After the powder is deposited, a recoater blade can be passed over the powder to create a substantially even layer of powder with a particular thickness, for example about 50 microns, or preferably about 30 microns, or still more preferably about 20 microns. Another feature of some embodiments of the present invention is a force feedback loop. There can be a sensor on the selective recoater that detects the force on the recoater blade. During the manufacturing process, if there is a time when the expected force on the blade does not substantially match the detected force, then control over the powder gates may be modified to compensate for the difference. For instance, if a thick layer of powder is to be provided, but the blade experiences a relatively low force, this scenario may indicate that the powder gates are clogged and thus dispensing powder at a lower rate than normal. Under these circumstances, the powder gates can be opened for a longer period of time to deposit sufficient powder. On the other hand, if the blade experiences a relatively high force, but the layer of powder provided is relatively thin, this may indicate that the powder gates are not being closed properly, even when the actuators are supposed to close them. Under these circumstances, it may be advantageous to pause the build cycle so that the system can be diagnosed and repaired, so that the build may be continued without comprising part quality. Another feature of some embodiments of the present invention is a camera for monitoring the powder layer thickness. Based on the powder layer thickness, the powder gates can be controlled to add more or less powder.

In addition, an apparatus according to an embodiment of the present invention may have a controlled low oxygen build environment with two or more gas zones to facilitate a low oxygen environment. The first gas zone is positioned immediately over the work surface. The second gas zone may be positioned above the first gas zone, and may be isolated from the larger build environment by an enclosure. For example, in FIG. 4 element 404 constitutes the first gas zone, element 419 constitutes the second gas zone contained by the enclosure 418, and the environment around the entire apparatus is the controlled low oxygen build environment. In the embodiment illustrated in FIG. 4, the first gasflow zone 404 is essentially the inner volume of the gasflow device 403, i.e. the volume defined by the vertical (xz plane) surfaces of the inlet and outlet portions (403A and 403B), and by extending imaginary surfaces from the respective upper and lower edges of the inlet portion to the upper and lower edges of the outlet portion in the xy plane. When the irradiation emission directing device directs a laser beam, then the gasflow device preferably provides substantially laminar gas flow across the first gas zone. This facilitates removal of the effluent plume caused by laser melting. Accordingly, when a layer of powder is irradiated, smoke, condensates, and other impurities flow into the first gasflow zone, and are transferred away from the powder and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates and other impurities can be efficiently removed while also rapidly cooling melt pool(s) created by the laser, without disturbing the powder layer, resulting in higher quality parts with improved metallurgical characteristics. In an aspect, the gas flow in the gasflow volume is at about 3 meters per second. The gas may flow in either the x or y direction.

The oxygen content of the second controlled atmospheric environment is generally approximately equal to the oxygen content of the first controlled atmospheric environment, although it doesn't have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For instance, nitrogen obtained by separating ambient air may be a convenient option for some applications. Some applications may use other gases such as helium, neon, or argon. An advantage of the invention is that it is much easier to maintain a low-oxygen environment in the relatively small volume of the first and second controlled atmospheric environments. In prior art systems and methods, the larger environment around the entire apparatus and object must be tightly controlled to have a relatively low oxygen content, for instance 1% or less. This can be time-consuming, expensive, and technically difficult. Thus it is preferable that only relatively smaller volumes require such relatively tight atmospheric control. Therefore, in the present invention, the first and second controlled atmospheric environments may be, for example, 100 times smaller in terms of volume than the build environment. The first gas zone, and likewise the gasflow device, may have a largest xy cross sectional area that is smaller than the smallest xy cross sectional area of the object. There is no particular upper limit on the size of the object relative to the first gas zone and/or the gasflow device. Advantageously, the irradiation emission beam (illustrated, for example, as 402 and 502) fires through the first and second gas zones, which are relatively low oxygen zones. And when the first gas zone is a laminar gasflow zone with substantially laminar gas flow, the irradiation emission beam is a laser beam with a more clear line of sight to the object, due to the aforementioned efficient removal of smoke, condensates, and other contaminants or impurities.

One advantage of the present invention is that, in some embodiments, the build plate may be vertically stationary (i.e. in the z direction). This permits the build plate to support as much material as necessary, unlike the prior art methods and systems, which require some mechanism to raise and lower the build plate, thus limiting the amount of material that can be used. Accordingly, the apparatus of the present invention is particularly suited for manufacturing an object within a large (e.g., greater than 1 m$^3$) build envelope. For instance, the build envelope may have a smallest xy cross sectional area greater than 500 mm$^2$, or preferably greater than 750 mm$^2$, or more preferably greater than 1 m$^2$. The size of the build envelope is not particularly limited. For instance, it could have a smallest cross sectional area as large as 100 m$^2$. Likewise, the formed object may have a largest xy cross sectional area that is no less than about 500 mm$^2$, or preferably no less than about 750 mm$^2$, or still more preferably no less than about 1 m$^2$. There is no particular upper limit on the size of the object. For example, the object's smallest xy cross sectional area may be as large as 100 m$^2$. Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by Mig or Tig welding, or by laser powder deposition. If the wall is built by additive manufacturing, then a different irradiation emission directing device can be used to build than wall than is used to build the object. This is advantageous because building the wall may be done more quickly with a particular irradiation emission directing device and method, whereas a slower and more accurate directing device and method may be desired to build the object. For example, the wall may be built from a rapidly built using a different material from the object, which may require a different build method. Ways to tune accuracy vs. speed of a build are well known in the art, and are not recited here.

Figure 8:
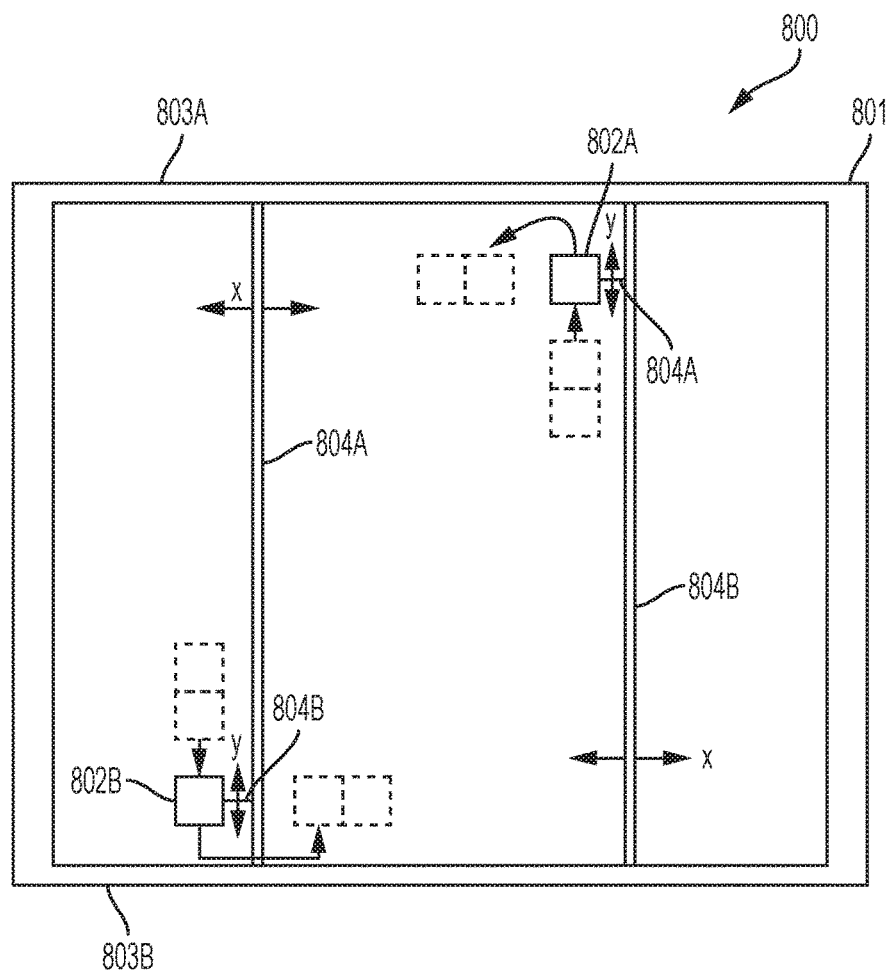
FIG. 8 illustrates a large scale additive manufacturing apparatus with two build units according to an embodiment of the present invention.

For example, as shown in FIG. 8, the systems and methods of the present invention may use two or more build units to build one or more object(s). The number of build units, objects, and their respective sizes are only limited by the physical spatial configuration of the apparatus. FIG. 8 shows a top down view of a large-scale additive manufacturing machine 800 according to an embodiment of the invention. There are two build units 802A and 802B mounted to a positioning system 801. There are z crossbeams 803A and 803B for moving the build units in the z direction. There are x crossbeams 804A and 804B for moving the build units in the x direction. The build units 802A and 802B are attached to the x crossbeams 804A and 804B by mechanisms 805A and 805B that move the units in the y direction. The object(s) being formed are not shown in this view. A build envelope (also not shown in this view) can be built using one or both of the build units, including by laser powder deposition. The build envelope could also be built by, e.g., welding. In general, any number of objects and build envelopes can be built simultaneously using the methods and systems of the present invention.

Advantageously, in some embodiments of the present invention the wall may be built up around the object dynamically, so that its shape follows the shape of the object. A dynamically built chamber wall advantageously results in the chamber wall being built closer to the object, which reduces the size of support structures required, and thus reduces the time required to build the support structures.

Further, smaller support structures are more stable and have greater structural integrity, resulting in a more robust process with less failure. In one embodiment, two build envelopes may be built, one concentric within the other, to build objects in the shape of, for example, circles, ovals, and polygons. If the wall is built by welding, then support structures such as buttresses may be advantageously built on the wall as needed, to support overhangs and other outwardly-built features of the object. Therefore, according to an embodiment of the present invention, a dynamically built chamber wall enables object features that would be either impossible or impractical using conventional technology.

Figure 9A:
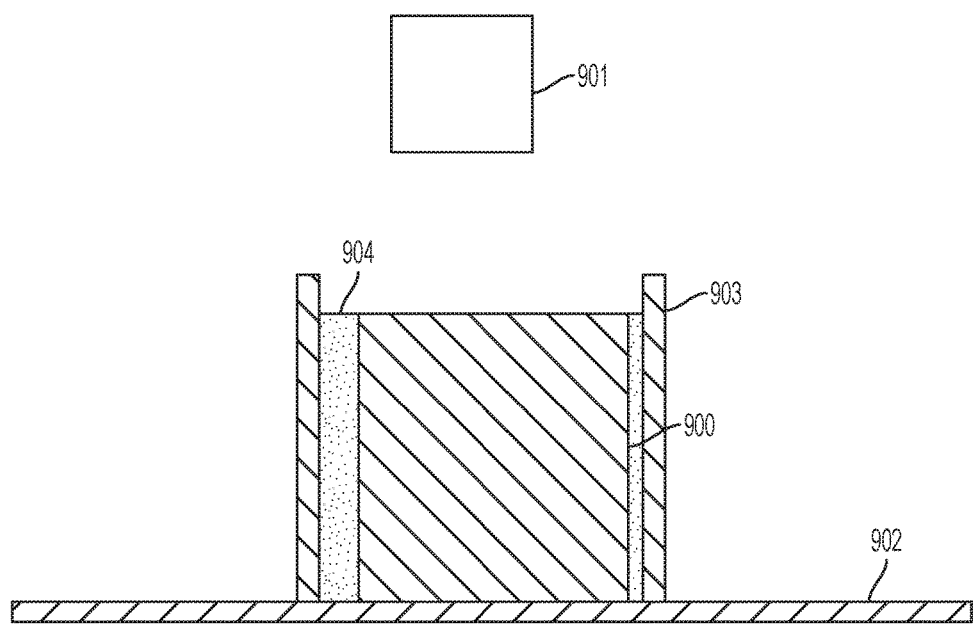
FIGS. 9A-9C illustrate a system and process of building an object according to an embodiment of the invention.
Figure 9B:
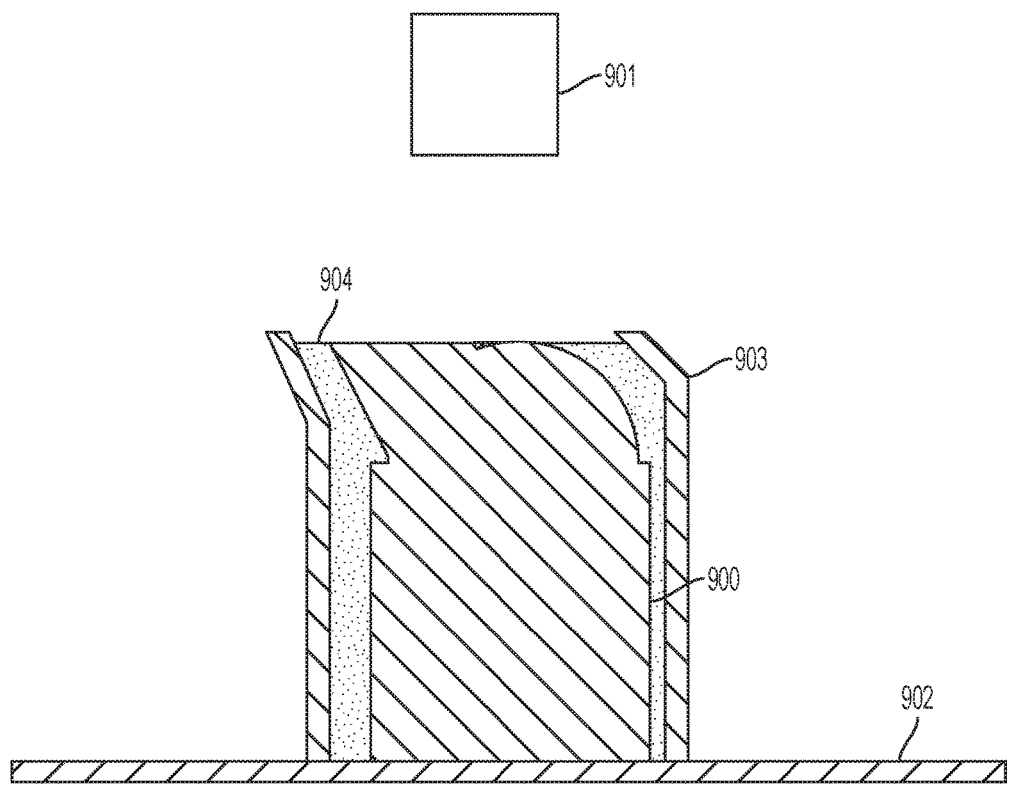
Figure 9C:
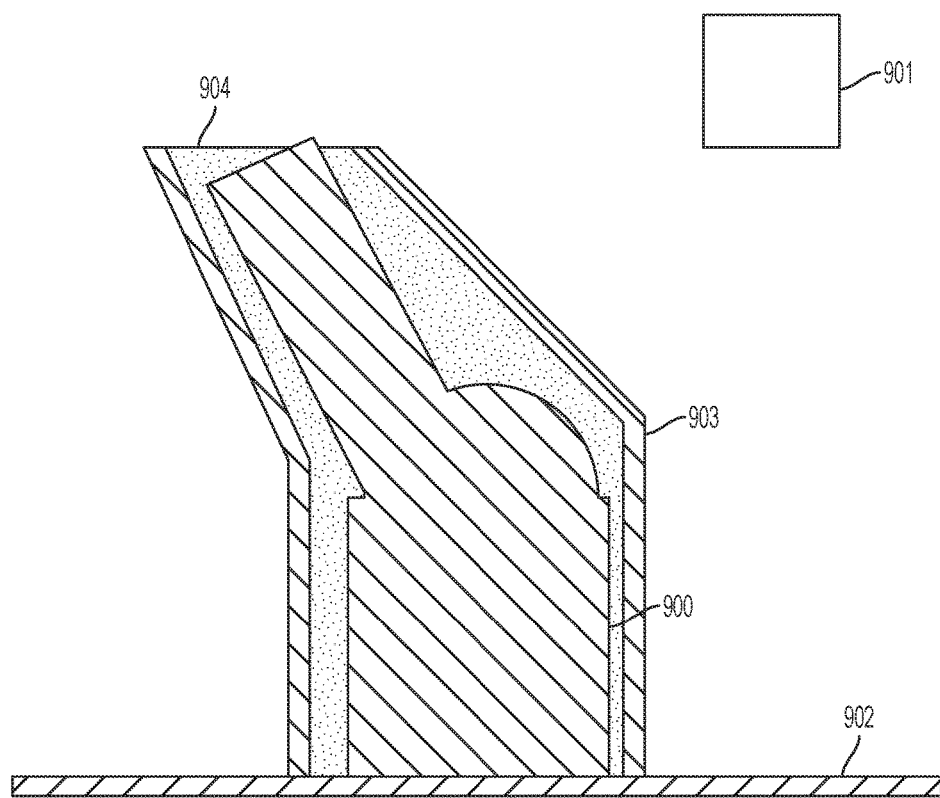

FIGS. 9A-9C illustrate an object built vertically upward from powder, within a dynamically grown build envelope, on a vertically stationary build plate according to one embodiment of the present invention. In this illustration the object 900 is built on a vertically stationary build plate 902 using a build unit 901. Since the build unit 901 may be capable of selectively dispensing powder within the build envelope 903, the unfused deposited powder 904 is generally entirely within the build envelope 903, or at least a substantial portion of the unfused deposited powder 904 stays within the build envelope 903. As shown in FIG. 9C, the build unit 901 may be moved away from the object 900 to more easily access the object 900. Mobility of the of the build unit 901 may be enabled by, for instance, a positioning system (not shown in this view).

Figure 10A:
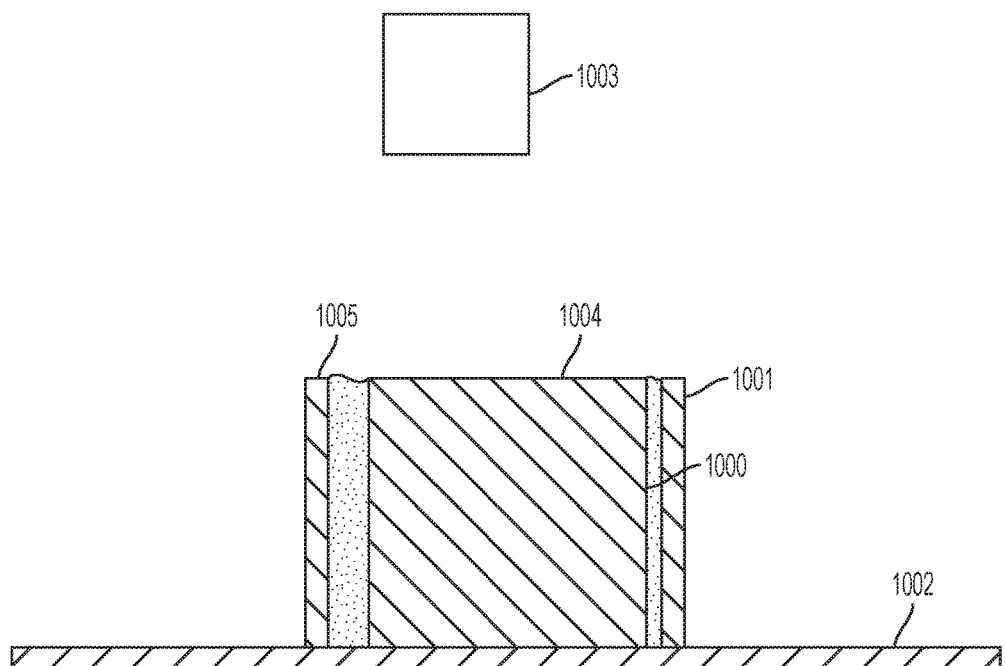
FIGS. 10A-10D illustrate a system and process of building an object according to an embodiment of the invention.
Figure 10B:
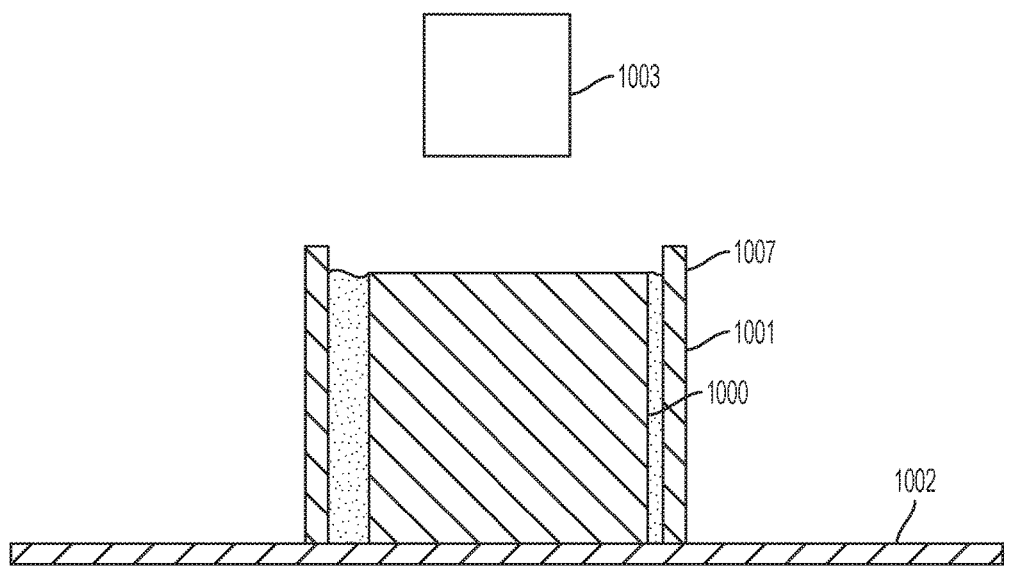
Figure 10C:
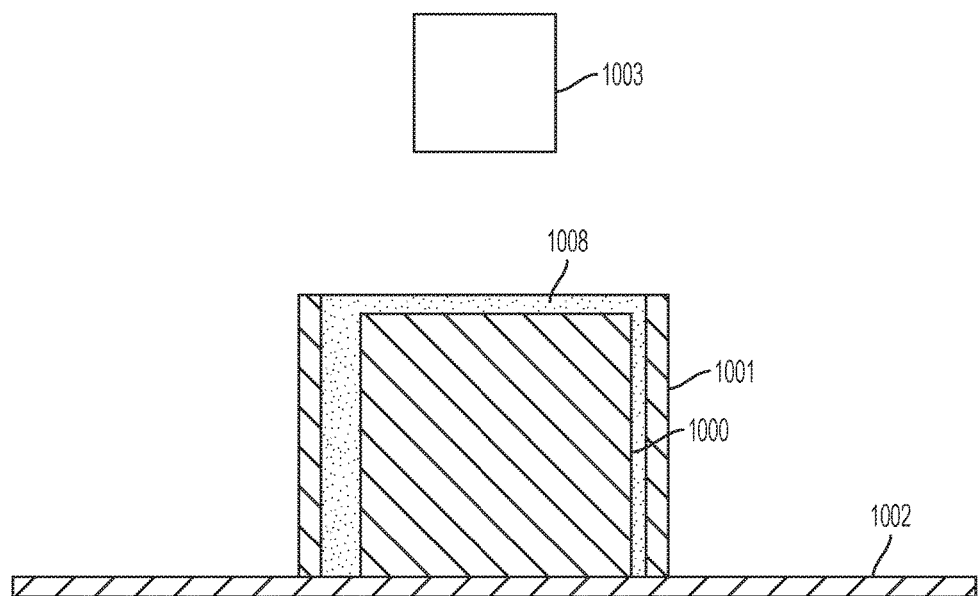
Figure 10D:
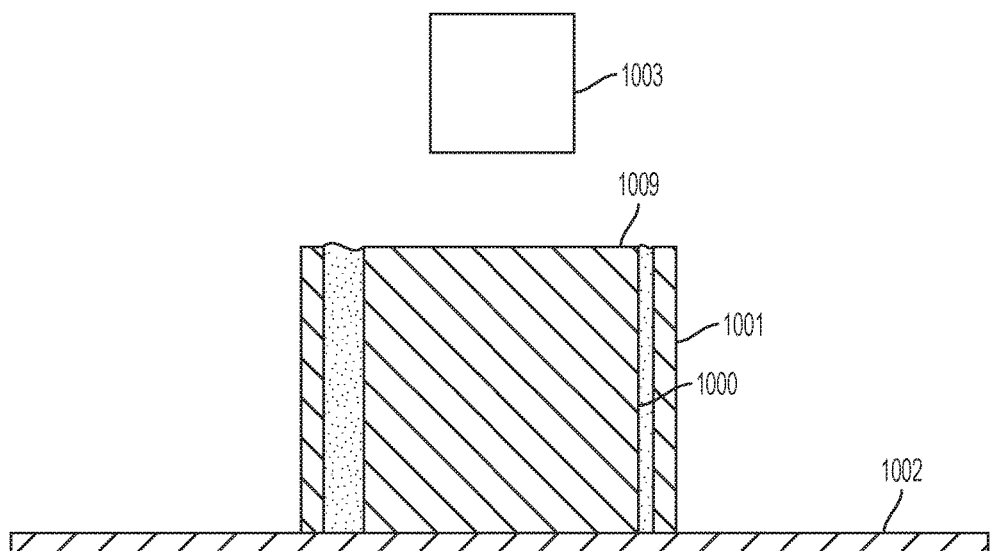

FIGS. 10A-10D illustrate a system and process of building an object 1000 and build envelope 1001 layer by layer on a vertically stationary build plate 1002, using a build unit 1003. The object 1000 has a topmost fused layer 1004 and the build envelope 1001 has a topmost fused layer 1005. There is unfused deposited powder 1006. In this particular illustration of one embodiment of the present invention, a first layer of the build envelope 1001 is built, as shown by element 1007 in FIG. 10B. Then the build unit may provide a fresh layer of powder 1008 (FIG. 10C). Then the fresh layer of powder may be irradiated to form a new topmost fused layer of the object 1009 (FIG. 10D). Mobility of the of the build unit 1003 may be enabled by, for instance, a positioning system (not shown in this view).

Figure 11:
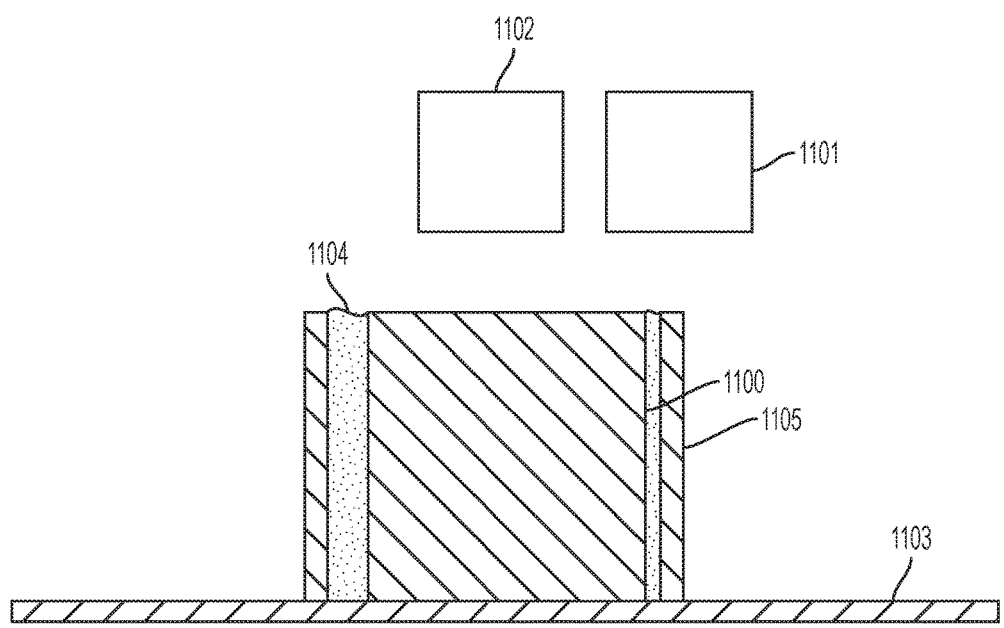
FIG. 11 shows an object being built by two build units in accordance with an embodiment of the invention.

FIG. 11 shows an object 1100 being built by a build units 1102 and a build envelope 1105 being built by a build unit 1101 on a vertically stationary build plate 1103. There is unfused deposited powder 1104. Mobility of the of the build units 1101 and 1102 may be enabled by, for instance, a positioning system (not shown in this view).

Figure 12:
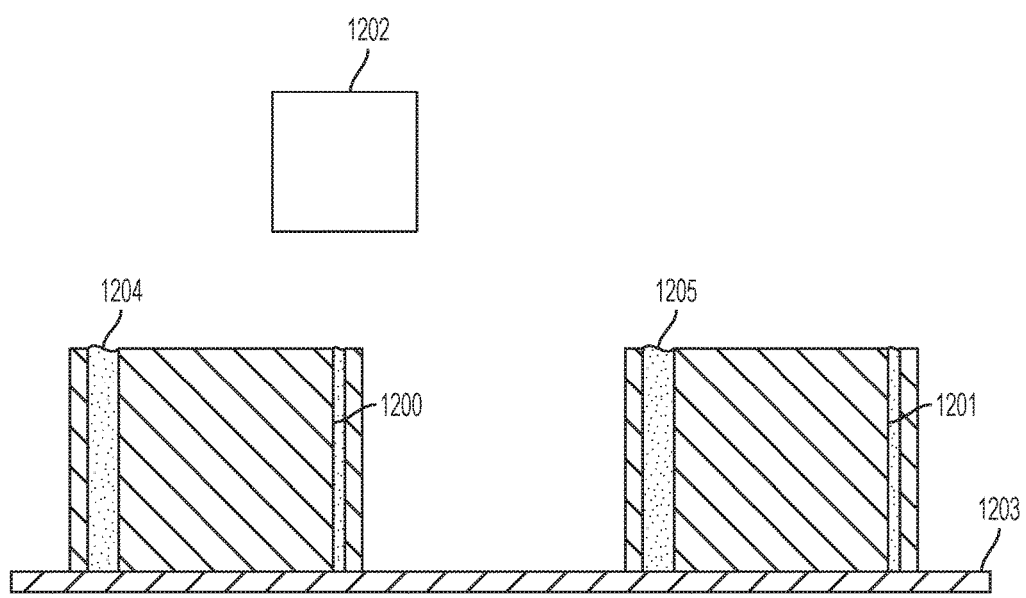
FIG. 12 shows two objects being built by a single build unit according to an embodiment of the invention.

FIG. 12 shows two objects 1200 and 1201 being built by a single build unit 1202 on a vertically stationary build plate 1203. There is unfused deposited powder 1204 and 1205. Mobility of the of the build unit 1202 may be enabled by, for instance, a positioning system (not shown in this view).

The invention claimed is:

1. An additive manufacturing apparatus comprising:
    a build unit comprising a powder dispenser, the powder dispenser comprising a powder storage area and at least a first and second gate, the first gate operable by a first actuator that allows opening and closing the first gate, the second gate operable by a second actuator that allows opening and closing the second gate, and each gate adapted to control the dispensation of powder from the powder storage area onto a work surface, the at least first and second gate arranged along the width of the powder dispenser, wherein the powder dispenser moves in an x and y direction over a build envelope, the build unit further comprising a first gas zone positioned immediately over a work surface, a second gas zone contained by an enclosure, a recoater blade, and an irradiation emission directing device.

2. The apparatus of claim 1, wherein the recoater blade is adapted to provide a layer of powder over a work surface.

3. The apparatus of claim 1, wherein the irradiation emission directing device is adapted to direct an e-beam.

4. The apparatus of claim 1, wherein the irradiation emission directing device is adapted to direct a laser beam.

5. The apparatus of claim 2, wherein the gasflow device is adapted to provide a substantially laminar flow of gas over the layer of powder.

6. The apparatus of claim 1, wherein each actuator is electric or pneumatic.

7. The apparatus of claim 1, wherein the powder dispenser and each gate are made out of cobalt-chrome.

8. The apparatus of claim 1, wherein the powder dispenser comprises at least ten gates.

9. The apparatus of claim 1, wherein the powder dispenser comprises at least twenty gates.

10. The apparatus of claim 4, wherein the irradiation emission directing device directs laser irradiation from a fiber-optic cable.

* * * * *